United States Patent [19]

Breslow et al.

[11] 3,725,904

[45] Apr. 3, 1973

[54] ENCODER WITH A REDUNDANT OPTICAL SYSTEM

[75] Inventors: Donald H. Breslow, Framingham Center; Sidney A. Wingate, Concord, both of Mass.

[73] Assignee: Itek Corporation, Lexington, Mass.

[22] Filed: July 23, 1971

[21] Appl. No.: 165,620

[52] U.S. Cl. ....................................340/347 P, 250/219 D

[51] Int. Cl. ...................................G08c 9/06, H03k 13/02

[58] Field of Search....340/347 P, 146.1 BA, 147 SC; 179/100.2 T; 250/219 D

[56] References Cited

UNITED STATES PATENTS

| | | | |
|---|---|---|---|
| 3,242,478 | 3/1966 | Kaestner | 340/347 P |
| 3,509,562 | 4/1970 | Hafle | 340/347 P |
| 3,016,517 | 1/1962 | Saltzberg | 340/147 SC |
| 2,997,697 | 8/1961 | MacAdam | 179/100.2 T |

*Primary Examiner*—Thomas A. Robinson
*Attorney*—Homer O. Blair et al.

[57] ABSTRACT

An absolute rotary encoder in which a redundant optical system is located at any one of several angular positions around the encoder disc relative to the original optical system. In the event of failure of a component in the original optical system, the redundant optical system is connected in place of the original optical system. In the embodiment where the redundant optical system is located at 90° away from the original optical system, signals from the redundant optical system are identical to signals from the original optical system for all but the most coarse and second most coarse encoder tracks. Signals from the photodetectors for the most coarse and second most coarse tracks of the redundant optical system are fed to compensating logic circuits which operate on these signals and yield positional output signals for the most and second most coarse tracks which are identical to positional output signals which would have been produced by the original optical system. In addition a simple logic circuit is provided which recognizes whether the primary or redundant system is connected and then performs the necessary signal switching.

9 Claims, 4 Drawing Figures

Sidney A. Wingate
Donald H. Breslow
INVENTORS
BY William C. Roch
ATTORNEY

ENCODER WITH A REDUNDANT OPTICAL SYSTEM

BACKGROUND OF THE INVENTION

The present invention relates generally to an improvement in absolute angular encoders, and more particularly pertains to a new and improved encoder wherein a redundant optical system is provided in the encoder for utilization in the event of a component failure in the original optical system. In the absolute encoder field it has been the practice to provide an absolute encoder with one optical system consisting of a source of illumination and photodetectors for sensing all encoder tracks. In the event of a failure of either a light bulk or a photodetector the encoder normally had to be returned to the factory for replacement of the failed component. Aside from the expense involved in the repair, the faulty encoder might cause a lengthy shut down of the overall system in which it functions. Some encoders have been provided with field replaceable light bulbs, but this type of encoder design introduces other problems. The replacement light bulb might not be correctly aligned within the encoder, and the relative brightness of light bulbs varies from bulb to bulb and these conditions can cause erroneous encoder operation not easily detected by the user.

SUMMARY OF AN EMBODIMENT OF THE INVENTION

An absolute encoder is described wherein a redundant sensing system is provided for utilization in the event of a failure of a component in the original sensing system. The redundant sensing system is positioned at a different location along the encoder track. Compensating logic circuitry is utilized to manipulate the signals from the redundant sensing system for a number of the coarser encoder tracks to yield positional data identical to that which would have been produced by the original sensing system.

DETAILED DESCRIPTION OF AN EMBODIMENT OF THE INVENTION

Figure 1:
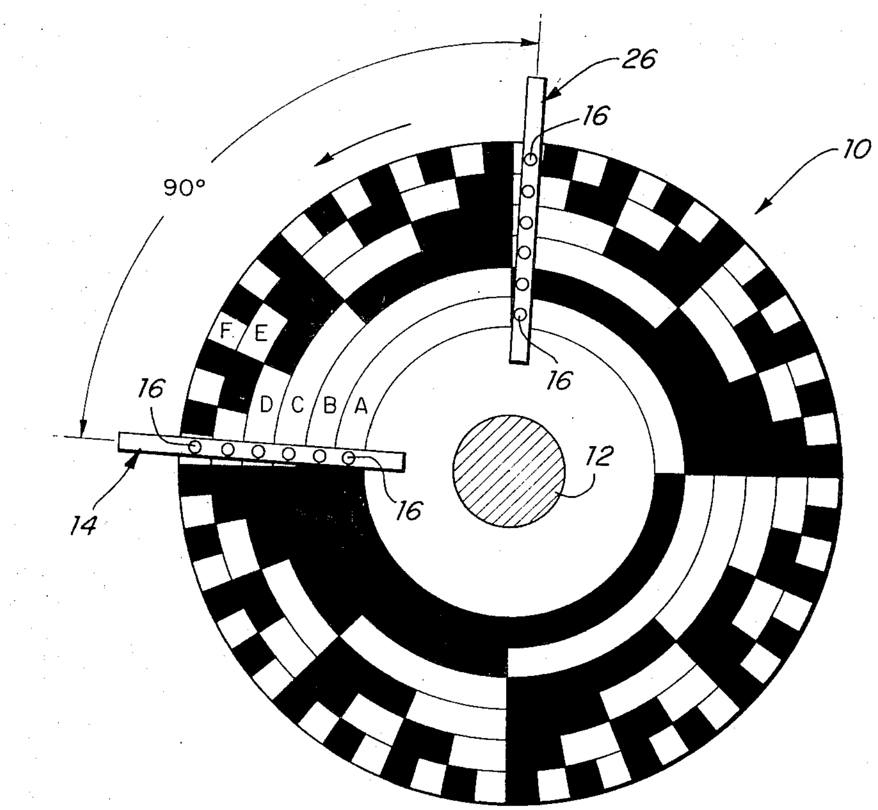
FIG. 1 is a view of a natural binary, absolute encoder disc with both original and redundant optical systems positioned relative thereto.

FIG. 1 is a view of a natural binary, absolute encoder plate 10 mounted on encoder shaft 12, which is normally coupled to a rotatable shaft the position of which is being measured. Encoder plate 10 is in the form of a disc, and has an original optical sensing system 14 and a redundant sensing system 26 mounted adjacent to it. Redundant optical system 26 is positioned 90° around the encoder disc relative to original optical system 14. Encoder disc 10 has six tracks ranging from the most coarse track A, which has an opaque areas around 180° of the encoder disc and a transparent area around the remaining 180° of the encoder disc, to the finest track F which is finely divided into a number of alternating opaque and transparent areas. A six track encoder disc is shown merely for illustrative purposes, and an encoder disc with any number of tracks might be utilized while practicing this invention. The optical systems 14 and 26 are securely mounted to the housing of the encoder, and encoder disc 10 rotates relative to the optical systems. Each optical system has a plurality of light sources 16 located on one side of the encoder disc and a plurality of photodetectors located on the opposite side of the disc. Each photodetector senses whether its encoder track is selectively blocking light with an opaque increment or passing light through a clear increment. Each photodetector produces a logical zero output signal when its encoder track is blocking light and a logical one output signal when its encoder track is passing light. The combined signals from all of the photodetectors provide an unambiguous indication of the angular position of the encoder disc.

The redundant optical system 26 is provided in the event of a failure of a light bulb or a photodetector in the original optical system. In the event of such a failure in the original optical system, the redundant optical system is connected into the encoder in place of the original optical system. FIG. 1 illustrates each optical system as being located along one radial line from the center of the encoder disc, but in other embodiments each optical system may be staggered from track to track along different radial lines.

An examination of encoder disc 10 in FIG. 1 will reveal that original optical system 14 and redundant optical system 26 yield identical signals for each of encoder tracks C, D, E, and F. However, original optical system 14 and redundant optical system 26 produce different signals for encoder tracks A and B, depending upon the relative position of encoder disc 10. If signals for tracks A and B were read out for the position illustrated in FIG. 1, and then for positions in which encoder disc 10 is rotated 90°, 180° and 270° clockwise from the position illustrated in FIG. 1, the signals would be as shown in the following table. In this table signals A and B are the signals produced by the original optical system for tracks A and B, and signals A′ and B′ are the signals produced by the redundant optical system for tracks A and B.

| Rotation of Disc 10 | Original Optical System 14 | Redundant Optical System 26 |
|---|---|---|
| | A B | A′B′ |
| 0° | 1 1 | 1 0 |
| 90° | 0 0 | 1 1 |
| 180° | 0 1 | 0 0 |
| 270° | 1 0 | 0 1 |

These readings are illustrative of other intermediate readings on the encoder disc.

Figure 2:
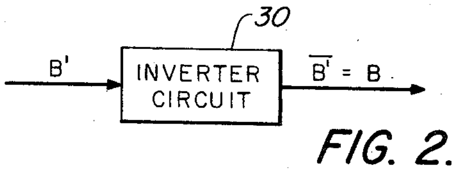
FIG. 2 is a block diagram of a logic circuit which performs a logical computation on the signal from the redundant optical system for the second most coarse track to produce a positional output signal which is identical to the positional output signal which would have been produced by the original optical system.

Examining the signals for encoder track B in the above table, it may be seen that the signal B′ is always the complement of the signal B. Thus, a signal B′ by redundant optical system 26 may be converted into an equivalent signal B by original optical system 14 by simply taking the complement of B′. FIG. 2 illustrates a block diagram of logic circuit 30 which performs an inversion of the signal from the redundant optical system for the track B to produce a positional output signal which is identical to the positional output signal which would have been produced by the original optical system for the track B.

Examining the signals for encoder track A in the above table, it may be noted that whenever signals A′ and B′ are different, signal A of the original optical system is a one. Whereas, whenever the signals A′ and B′ are identical the signal A of the original optical system is a zero. Thus the signal A may be derived from an exclusive OR operation on A′ and B′:

$$A = A'B' + A'B'$$

Figure 3:
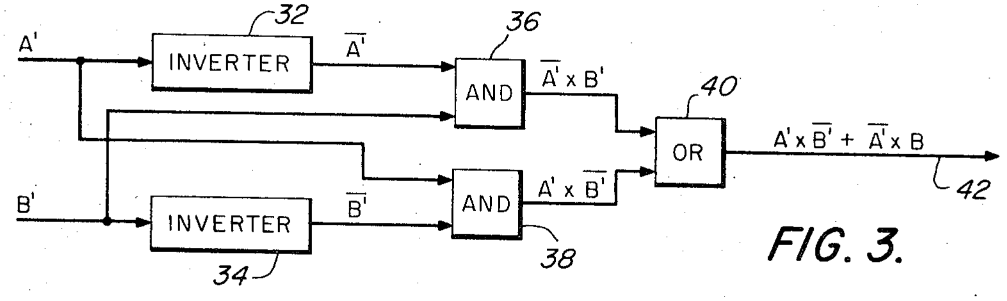
FIG. 3 is a block diagram of a logic circuit which operates on the signals from the redundant optical system for the most coarse and second most coarse tracks to produce a positional output signal for the most coarse track which is identical to the signal which would have been produced by the original optical system.

FIG. 3 is a block diagram of a logic circuit which operates on the signals from the redundant optical system for the A and B tracks to produce a positional output signal for the A track which is identical to the signal which would have been produced by the original optical system. This logic circuit creates the exclusive OR operation of the above equation. Inverters 32 and 34 complement the signals A′ and B′ respectively. The two AND circuits 36 and 38 combine the pairs of variables which are fed into the OR gate 40. The output signal on line 42 is a positional signal for the A track from the redundant optical system which is identical to the positional output signal for the A track which would have been produced by the original optical system.

Figure 4:
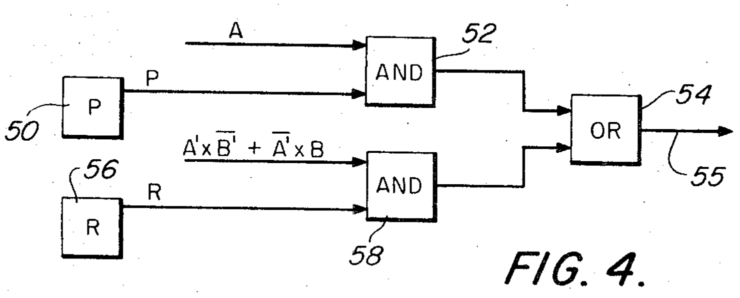
FIG. 4 illustrates a logic circuit which performs the function of switching the signal for the most significant track from either the original or the redundant sensing station to the final output line.

FIG. 4 shows a logic circuit which simply performs the function of switching either the signal A or the derived signal $A'B' + A' \times B$ to the final output line depending upon whether the primary or the redundant reading station is connected. An identical circuit would be used to switch the B and $B'$ signals for the B track. When the primary reading station is connected in the encoder, a pin 50 in the electrical connector presents an enabling voltage to AND gate 52 to pass the signal A from the primary reading station for the most significant track. Signal A passes through OR gate 54 to the final output line 55 for the most significant track. When the redundant reading station is connected in the encoder a pin 56 in the electrical connector applies an enabling voltage to AND gate 58 to pass the output of the circuit illustrated in FIG. 3. The output from AND gate 58 is then applied through OR gate 54 to the final output line 55 for the most significant track. Depending upon whether the primary or the redundant reading station is connected in the encoder a voltage will be applied to either pin 50 or pin 56 to pass the appropriate output signal for the most significant track to the final output line 55. In essence, the circuit of FIG. 5 functions as a single pole, double throw switch to pass the appropriate output signal to the final output line 55.

The disclosed embodiment is an absolute rotary encoder wherein a redundant optical system is provided at a position 90° around the encoder disc relative to the original optical system. This 90° position has been chosen for illustrative purposes as it involves a small number of logical computations for the signals from the coarser encoder tracks to yield an output positional signal from the redundant optical system which is identical to that which would have been produced by the original optical system. However, other angular positions around the encoder disc might be utilized. For instance, the redundant optical system might be positioned 45° around the encoder disc relative to the original optical system. This position would require logical computations for the signals from the three most coarse encoder tracks instead of the two most coarse encoder tracks, as illustrated by the disclosed embodiment.

I claim:

1. In an absolute encoder having an encoder plate, and an original sensing system for sensing the position of said encoder plate relative to said original sensing system, said original sensing system being located at a first position relative to said encoder plate and producing a positional output signal indicative of the position of said encoder plate relative to said original sensing system, the improvement comprising:

a. a redundant sensing system, located at a second position different from said first position along said encoder plate, for sensing the position of said encoder plate relative to said redundant sensing system and for producing a positional output signal indicative of the position of said encoder plate relative to said redundant sensing system; and b. electrical conversion means, coupled to said redundant sensing system, for converting signals from said redundant sensing system to produce a positional output signal for the encoder which is the equivalent of the positional output signal which would have been produced by the original sensing system for the same position of the encoder plate.

2. Apparatus as set forth in claim 1 wherein said absolute encoder is a rotary encoder and said encoder plate is a disc.

3. Apparatus as set forth in claim 2 wherein said redundant sensing system is positioned 90° around said encoder disc relative to said original sensing system.

4. Apparatus as set forth in claim 1 wherein said encoder plate has a plurality of encoder tracks ranging from a most coarse encoder track to a most fine encoder track, and said original sensing system includes means for producing a plurality of signals, at least one for each encoder track, all of which form said positional output signal of said original sensing system, and further including:

a. said redundant sensing systems having means for producing a plurality of signals, at least one for each encoder track, all of which form said positional output signal of said redundant sensing system.

5. Apparatus as set forth in claim 4 wherein said electrical conversion means includes a first logic circuit connected to the output circuit of said redundant sensing system for the second most coarse track for logically converting the signal for the second most coarse track from said redundant sensing system to produce a signal identical to the signal which would have been produced for the second most coarse track by the original sensing system, and a second logic circuit connected to the output circuits of said redundant sensing system for the most coarse and second most coarse tracks for logically converting the signal from said redundant sensing system for the most coarse encoder track to produce a signal for the most coarse encoder track which is identical to the signal which would have been produced for the most coarse encoder track by the original sensing system.

6. Apparatus as set forth in claim 4 wherein:

a. said encoder is an optical encoder;

b. said original sensing system is an optical system having a plurality of light sources to illuminate said encoder track, and a plurality of photodetectors, at least one for each track, for sensing whether each track is passing or blocking light; and c. said redundant sensing system is an optical system having a plurality of light sources to illuminate said encoder tracks, and a plurality of photodetectors, at least one for each track, for sensing whether each track is passing or blocking light.

7. Apparatus as set forth in claim 6 wherein said absolute encoder is a rotary encoder and said encoder plate is a disc.

8. Apparatus as set forth in claim 7 wherein said redundant sensing system is positioned 90° around said encoder disc relative to said original sensing system.

9. Apparatus as set forth in claim 8 wherein said electrical conversion means includes a first logic circuit connected to the output circuit of said redundant sensing system for the second most coarse track for logically converting the signal for the second most coarse track from said redundant sensing system to produce a signal identical to the signal which would have been produced for the second most coarse track by the original sensing system, and a second logic circuit connected to the output circuits of said redundant sensing system for the most coarse and second most coarse tracks for logically converting the signal from said redundant sensing system for the most coarse encoder track to produce a signal for the most coarse encoder track which is identical to the signal which would have been produced for the most coarse encoder track by the original sensing system.

* * * * *